United States Patent [19]
Hanson

[11] Patent Number: 5,281,454
[45] Date of Patent: Jan. 25, 1994

[54] CLOSED COMPOSITE SECTIONS WITH BONDED SCARF JOINTS

[75] Inventor: Brad A. Hanson, Huntington Beach, Calif.

[73] Assignee: Kaiser Aerospace & Electronics Corporation, Foster City, Calif.

[21] Appl. No.: 745,750

[22] Filed: Aug. 16, 1991

[51] Int. Cl.$^5$ .............................. B32B 1/08; B32B 3/06
[52] U.S. Cl. .................................. 428/36.3; 428/36.9; 428/36.91; 428/57; 428/60; 138/155
[58] Field of Search ............... 428/60, 57, 36.9, 36.91, 428/36.3; 156/304.5, 304.2; 138/155, 154

[56] References Cited
U.S. PATENT DOCUMENTS
3,686,061 8/1972 Brown et al. .................... 428/60

FOREIGN PATENT DOCUMENTS
245349 6/1969 U.S.S.R. ........................ 156/304.5
567973 3/1945 United Kingdom ............ 156/304.5

Primary Examiner—Alexander S. Thomas
Attorney, Agent, or Firm—Marvin H. Kleinberg

[57] ABSTRACT

A novel joint for connecting a closed composite adherend utilizes complementary scarf surfaces on the adherends and then bonds the adherends together. The angle of the scarf is determined by the materials used and the expected loads. Preferably, constant stiffness is achieved through the joint. In alternative embodiments, lap joint areas are included to create localized stress free zones. A method of creating the scarf surfaces utilizes a wrapping technique in which the edges of a lamina of composite material are prepared so as to provide a desired edge termination which permits each layer to be bonded to the adjacent adherend.

17 Claims, 4 Drawing Sheets

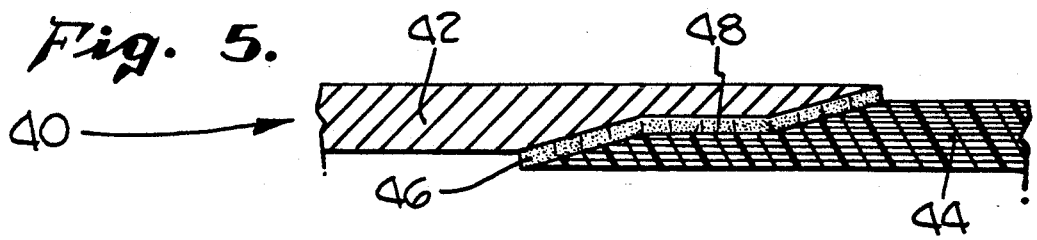
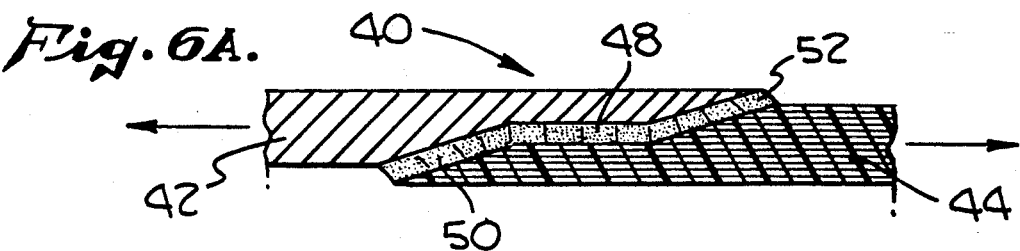
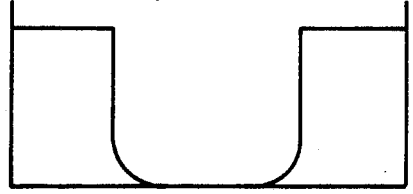
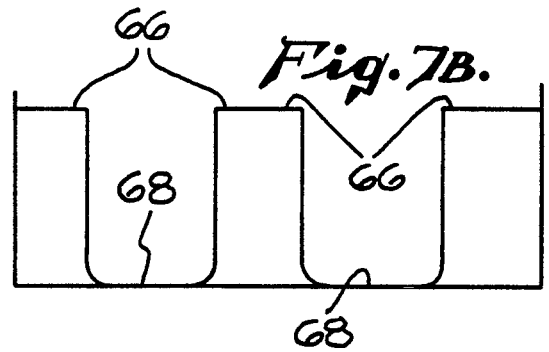
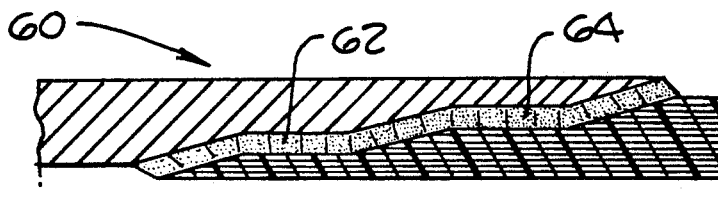
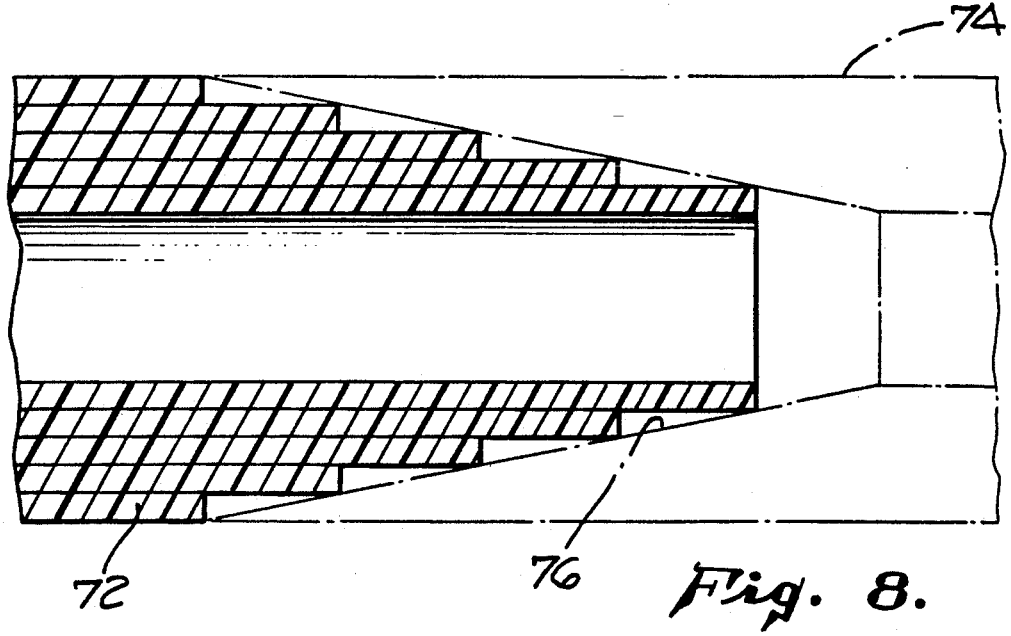

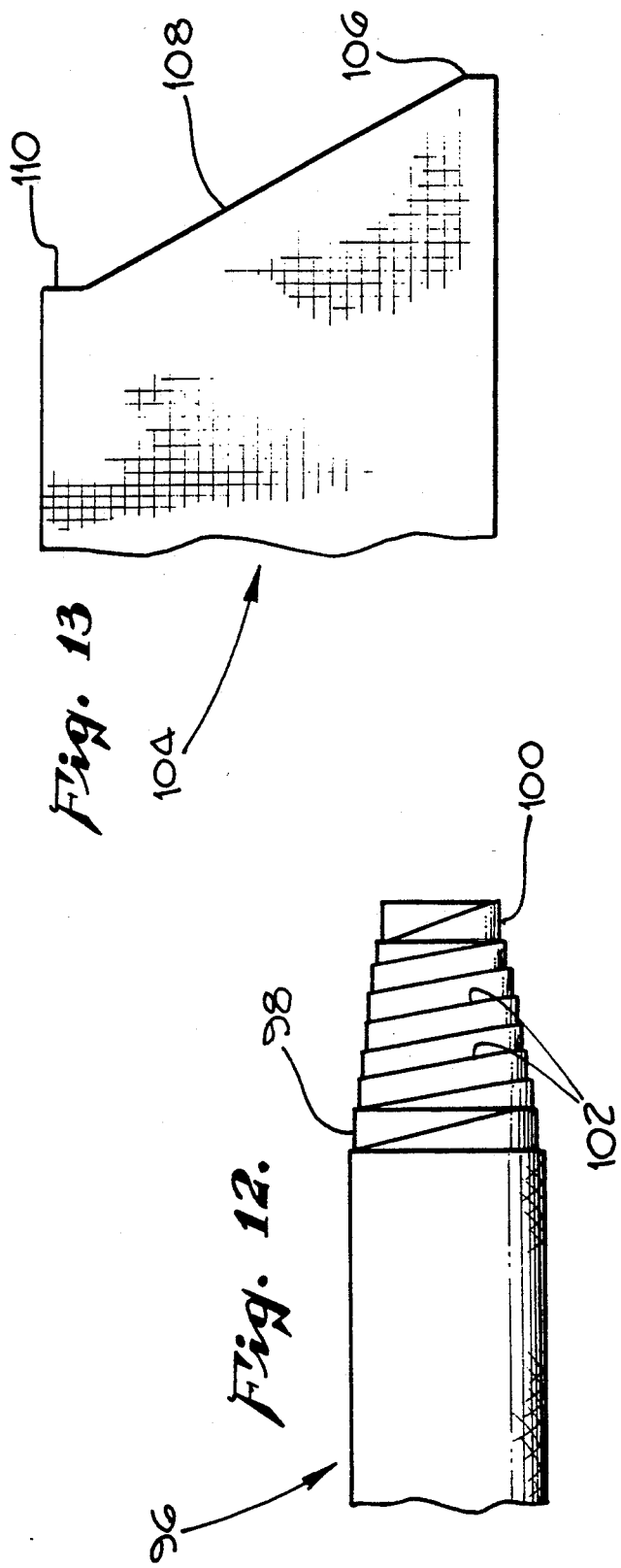

CLOSED COMPOSITE SECTIONS WITH BONDED SCARF JOINTS

INTRODUCTION

The present invention relates to composite structures and more particularly, to a novel bond between dissimilar materials and a method for determining how an optimum bond can be effected.

It has been known for some years that a composite material, such as fiber reinforced plastic or epoxy impregnated carbon fiber fabric can be bonded to a metal part and have a reasonable good structural relationship. Problems with adequate structural efficiency have limited wide spread use of such parts. Flat or gradually curved composite structures have been bonded to metal parts and generally, such parts serve successfully. One such technique was disclosed in application Ser. No. 07/012,567, filed Feb. 9, 1987, now abandoned, which was assigned to the assignee of the present invention.

In recent years, composites have been formed into strong tubular elements which are used as a structural element of control systems for aircraft, as an example. One technique for creating appropriate composite tubes has been shown and described in U.S. Pat. No. 4,963,301. Variations on that technique have been described in a copending application for patent Ser. No. 07/721,414, filed Jun. 26, 1991, which has been assigned to the assignee of the present invention.

PRIOR ART

The patent to Rolf Berg, U.S. Pat. No. 4,300,963, teaches a composite cylindrical tube in which a plastic foil web and at least one fibre web are helically wound upon a heated mandrel. The foil web is wider than the fibre web and the combination is wound at an angle such that the free edges of the foil web overlap each other and are welded together to result in a substantially fluid tight cylinder with additional fibre webs providing structural support. This process results in a fluid tight container when caps are used to seal off the ends of the cylinder. Although a spiral or helical wrap is taught, it is only to create a fluid tight cylindrical container.

A strut component, which may be useful in aircraft, comprised of a composite tubular body and metal ends is shown in U.S. Pat. No. 4,469,730 to Frank M. Burhans. An elongated base structure, such as a tube, has a specially shaped end to overly the large diameter end of the conical end fitting which may be made of the same or different materials. The fibers making up each layer alternatingly extend in the axial and transverse direction.

Alternating with these layers are circumferentially wrapped layers. The layers terminate at the smaller conical end and the number of layers on the base structure are greater than the number of layers on the conical portion. The larger conical end has a short cylindrical shoulder segment to support the composite layers. Where torsional or twisting forces are to be resisted, serrations, alternate lands and grooves or other axially directed irregularities are formed in the cone and shoulder surfaces of the end fitting.

As can be seen, all of the bonds are either lap joints of a single layer to the metal fitting or a butt joint where several layers end at a metal surface substantially perpendicular to the several layers. The combination of an increased diameter and then a decreased diameter provides additional resistance to separation of the laminate from the metal fitting.

Similar composites can be joined together with increased bond strength, usually with planar elements by using scarf surfaces and an adhesive. One such technique is shown in the patent to Richard C. Nickols et al, U.S. Pat. No. 4,755,429, in which a plurality of plates are joined to create larger plate having an increased active surface area.

In the patent to Leiv H. Blad et al, U.S. Pat. No. 4,015,035, the scarfed mating surfaces of two planar elements were etched to expose short lengths of filament fibers. An unsupported adhesive sheet was then placed between the ends and the joint was bonded so that the exposed fibers crossed the bondline to intermesh during the melting of the adhesive, thereby adding strength to the bond.

Where composite tubes with metal ends are used as structural components, the loads to be transferred between the end and the composite tube may be substantial and applications exist in which such loads exceed 100,000 lbs. Prior art methods have not been universally successful in sustaining such loads. Because the combination of a composite material rod with a metallic end piece presents an attractive combination from a size and weight vantage point, it would be desirable to provide joints that can withstand substantial loads and yet be easily fabricated.

Composite materials can include woven and non woven fabrics of various materials which have been impregnated with plastics such as thermosetting epoxy resins. Other composites can be made up of "tapes" comprising a plurality of parallel fibers embedded in a plastic base, similar to the "strapping tape" that is currently used for wrapping packages. Filament winding processes also can produce composites when combined with a plastic adhesive material that can be cured in place. Pressure vessels are typically produced by filament winding over a fluid tight envelope with a thermally set plastic material that results in a integral structure.

Tubes or rods are created by adhering a single layer or lamina of the composite material, in the form of a web or sheet, which may be continuous, semi-continuous, or a plurality of single sheets to a mandrel and rotating the mandrel until sufficient plies have been added. The combination is then cured and the mandrel removed, leaving a closed or tubular composite of desired composition and shape. The composite web or sheet may be a woven fabric, a tape or may be a filament which is wound in a predetermined pattern to provide structural strength, depending upon the nature of the loads to which the composite tube is to be subjected. A tube may be built up of different lamina or plies. For example, a first ply may be a woven fabric with the warp and woof at a first angle. A second woven fabric ply may have the warp and woof at an angle different from that of the first ply.

A typical joint between a composite rod and a metal end portion is the lap joint shown in the Burhans patent. One adherend material overlies the other adherend material and an adhesive is placed between the two. Because of the relatively constant adherend thickness, an applied load, tending to pull the joint apart causes changes to occur at the ends of the joint but not in the middle portion. Accordingly, a rapid load transfer takes place at the ends until the two adherends are straining at the same rate, but a load transfer at the center of the joint does not occur.

During load transfer, the adhesive layer defining the bond line deforms at the edges but not in the center. Therefore, the performance of the entire bond is limited to the peak failure stress at the ends. A longer lap joint will not help since a longer joint will only achieve a longer zone of zero load transfer at an elongated central portion of the joint. It is also known that the bulk of the load will be borne by the layers of composite that are adjacent each other at the bond between the two adherends. If one of the adherends is a metal fitting, most of the load will be transferred to the composite layer at the bond and most of the other composite layers will not share the burden.

BRIEF SUMMARY OF INVENTION

Because the failure of the lap joint is caused by a dramatic stiffness change at the ends of the bond but no stiffness change at the center, a different type of joint has been proposed. Scarf joints have been used for joining planar materials and, to a lesser extent, in joining filament wound structures to metal bodies. Because the scarf joint has a continuous taper, the stiffness discontinuities are limited. The taper allows a more uniform load transfer along the entire joint and all of the adhesive is effective in transmitting a load. Because the two adherends are tapered, they are forced to gradually transmit the load at a rate that is determined by the angle of the scarf. Further, each of the layers of the composite will be individually bonded so that each of the layers can share the load.

A perfect joint would have a constant stiffness and this can be expressed by the equation:

$$E_1 t_1 = E_2 t_2$$

where "E" is Young's Modulus and "t" is thickness. With a longer scarf, more adhesive will be utilized and will permit a higher load to be transferred. However, this is only a goal and at less than "perfect" conditions, the scarf joint will be stronger than the lap joint with areas of zero stress.

A problem that has been encountered arises from the very things that makes the scarf joint better than the lap joint. Because all of the adhesive is effective in transmitting load, there is a potential for permanent plastic deformation arising from "creep." When a scarf joint is under constant stress at elevated temperatures, the plastic nature of the adhesive permits some movement or "creep" which could lead to permanent deformation.

It has been found that this problem can be solved by the incorporation of an "anti-creep" zone, which is a localized lap joint area which has zero stress. In these zones, the adhesive remains "elastic" thus permitting the joint to have "memory" which will allow it to regain the original configuration. For large loads, several "anti-creep" zones can be incorporated, resulting in a longer joint with a yet higher failure load. These are preferably localized in an area in which only one layer of composite is joined to the adjacent part in a partial lap, partial scarf bond. It may be desirable, in these areas, to provide a slightly longer "end" to the ply so that the scarf bond is the same length as for the other plies.

In creating scarf joints, it has been found that a smooth metal surface is superior to one which has been roughened, pitted or grooved. Such surface irregularities result in an irregular bondline thickness which induces strain concentrations in the adhesive and which could result in premature failures. Yet another finding is that each ply may be terminated at the adhesive individually along the length of the joint. To achieve this result, the fabric making up the ply is cut into incremental "steps" that are equal to the circumference of the tube at that layer, so that each ply terminates with an edge that is a predetermined distance from the edge of the adjacent ply.

Alternative arrangements are possible, with somewhat lesser performance. One alternative provides that the tapering thickness of the composite impregnated fabric results from a gradual widening of the fabric so that successive layers present a spiral edge. This process results in a somewhat weaker bond at the beginning and end of the spiral, but an equally strong bond throughout the remainder of the joint. By providing "steps" in the fabric at the first and last layers with a uniform taper between them, the ends remain strong and any weakness occurs only at the second and next to last interior layers. Anti-creep zones can be provided in these embodiments, but care must be taken to make the "flat" portion in a complementary spiral or helix.

Scarf joints can be made with the composite rod "inside" or "outside" the metal end or, in special cases, both inside and outside. In the preferred embodiments, the metal end covers and protects the joint and the bond is to an interior surface. Yet other applications may utilize a "double-scarf" joint in which the composite is bonded to both the interior and the exterior of the metal end piece.

In order to determine the optimum taper or length of the scarf joint between a composite material and a metal end fitting, several factors must be taken into consideration. The "stress-free" cure temperature for the composite must be determined from the nature of the composite materials that are used.

Locked in thermal stress results when the part goes from the "stress free" temperature at which it is cured to the ambient temperatures at which it functions. The range of operating temperatures is also noted so that a calculation can be made. The induced thermal stress can be superimposed over the stresses arising from the required load in order to compare against material allowables.

Several computer programs are available which enable a computation of the optimum configuration. These are generally known as Finite Element Analysis programs, among which are Numerically Integrated elements for Systems Analysis (NISA) which was published by Engineering Mechanics Research Corporation. A similar program, NASTRAN, was developed by the National Aeronautics and Space Administration while yet another program, ANSYS, was also developed.

These programs enable the computer modeling of the joint after the composite, adhesive and metal are specified. Initially, a data base is created in which model geometries and potential material properties are listed. For each material, the coefficient of thermal expansion, Young's Modulus, Shear Modulus and Poisson's Ratio must be listed. Where various composite materials are used, information about ply thickness and ply orientation is also listed. The properties of the various adhesives must also be included so that a computer model can be made of the combination on a layer by layer, increment by increment basis.

By specifying the materials and the anticipated working temperatures, it is possible to establish optimum scarf angles and lengths. It is also possible to prescribe anti creep zones and their location. The assignee of the present invention has found that push and pull rods could be made of titanium metal end fittings to which are joined carbon fiber fabrics that are impregnated with an epoxy.

When designing for tensile forces, compressive forces and shear forces, it may be necessary to design the laminate and select the material orientation for each ply. Typically, the thickness of the metal and the laminate may be the same, although not necessarily. While the "ideal" joint has constant stiffness, it may not always be practical or necessary. Where the thickness of the metal differs from the thickness of the tube, a longer scarf may be desirable.

When composite-metal combinations are used as "push-pull" rods, a rule of thumb has developed that the ratio of ply "step" to ply thickness should be approximately 30:1. That is, the length of each "step" should be thirty times the thickness of each ply. This cured ply thickness may be determined by measuring the thickness of the cured composite laminate and dividing by the number of plies. Ratios greater than 30:1 may be deemed unnecessarily conservative and ratios less than 20:1 are considered questionable, at least when dealing with combinations of carbon fiber and titanium metal for typical aircraft applications.

For example, when dealing with carbon fiber - titanium combinations, acceptable ratios have ranged from 20-25:1. Usually, however, the initial computer model is done with the 30:1 ratio. Moreover, when putting in stress free zones, it has been found preferable to terminate plies only on the scarf or angled portion of the metal end and not on the "flat," stress-free zone. Combinations which are used as structural elements require different properties and, accordingly, the computer model will help determine the optimum ratio for the step to thickness.

While the most common combination joins a cylindrical tube to a cylindrical end piece, other closed shapes could be used. For example, tubes of substantially oval, square, or any other geometric cross section that can be created on a mandrel can be employed. However, assignee's experience with cylindrical tubes has been greatest and the descriptions that follow will be directed to such shapes without limiting the scope of the invention to such tubular cylinders.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 5 is a side section view of a scarf joint bond with a single stress free zone;

FIG. 6 including FIG. 6A and FIG. 6B, is a side section view of the scarf joint bond with a stress free zone of FIG. 5, deformed by stresses, and a graphic representation of the stresses upon such a joint along the length of the joint;

FIG. 7 including FIG. 7A and FIG. 7B, is a side section view of a scarf joint with two stress free zones and a graphic representation of the stresses upon such a joint along the length of the joint;

FIG. 8 is side section view of a composite tube wrapped to provide an adhesive termination for each ply;

FIG. 12 is a top view of a composite tube with a first and last ply terminating in a single, cylindrical step with the remaining plies terminating in a helix or spiral; and FIG. 13 is a top view of a composite fabric cut to result in the composite tube of FIG. 12; and FIG. 14 is a side section view of a "double scarf" joint in which the composite fabric envelops the metal end fitting.

DETAILED DESCRIPTION OF THE DRAWINGS

Figure 1:
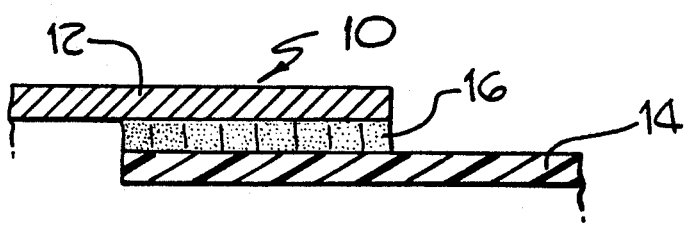
FIG. 1 is a side section view of a prior art lap joint bond.

Turning first to FIG. 1, there is shown an idealized section of a lap joint bond 10 according to the prior art. A first adherend 12, which may be of metal is joined to a second adherend 14 by means of an adhesive layer 16. The second adherend 14 can be a multilayer composite material comprised of a plurality of fiber layers which are impregnated with a plastic adhesive such as an epoxy. For applications in which bonded joints are subjected to stresses resulting from shear, torsion, tension, or compression, a thermosetting plastic is preferred, but thermoplastic materials may be utilized.

Figure 2A:
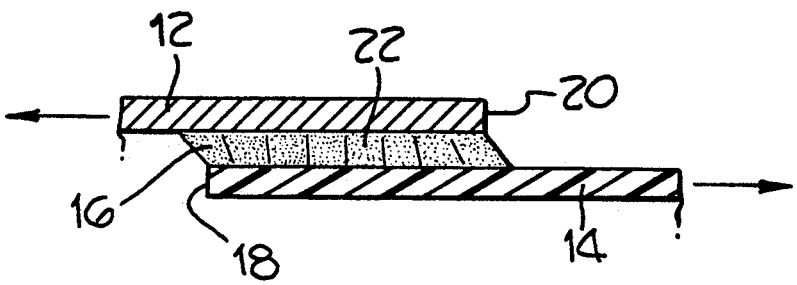
FIG. 2, including FIG. 2A
FIG. 2B is a side section view of a prior art lap joint bond deformed by stresses and a graphic representation of the stresses upon such a joint along the length of the joint.

All of the stresses that are applied to the first adherend 12 are transmitted to the second adherend 14 through the adhesive layer 16. As seen in FIG. 2A, when a strain tending to pull the adherends apart is experienced, the adhesive layer 14 deforms at the ends, 18, 20 but not in the center 22 of the joint.

Figure 2B:
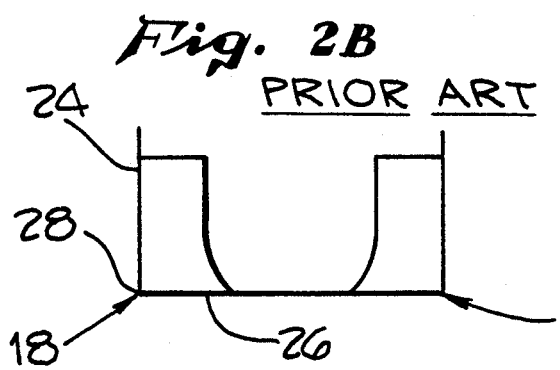

This condition is best appreciated by reference to FIG. 2B, which is a graphic representation of the forces upon the joint as a function of the length of the joint. As shown, the ordinate 24 represents a shear stress load across the joint and the abscissa 26 represents distance, with the origin 28 representing the left end of the joint 10. The curve is level so long as the adhesive 16 is plastically deformed, indicating a transmission of stress forces across the bond. It should be noted that a symmetric curve only occurs when the adherends are of equal stiffness. For example, a rubber band bonded to a steel beam will not pick up any appreciable load until the end of the beam.

However, as a function of the distance toward the central portion of the joint, the strain drops to a nominal value and then to zero, indicating that the adhesive is elastic and experiences no load in the center of the bond. As the opposite end of the joint 10 is approached, the curve is symmetrical and the load rises to the elevated level corresponding to the deformed adhesive 16 where the first adherend 12 ends.

As can be seen, increasing the load will not result in a deformation of more of the adhesive 16, but rather, will only result of a failure of the bond at the ends 18, 20. As the undeformed adhesive in the central portion of the joint picks up the load, it too will fail and the joint 10 will part. Additionally, a longer joint will not carry more load as the limiting factor is the stress at the ends.

Figure 3:
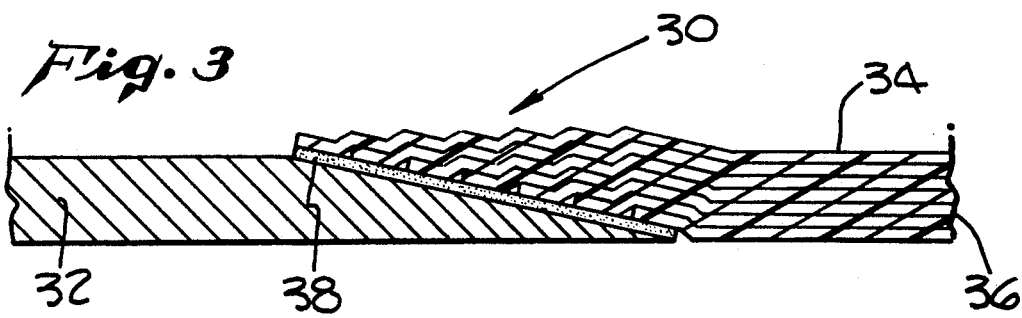
FIG. 3 is a side section view of a scarf joint bond according to the present invention.

Turning next to FIG. 3, there is shown an idealized scarf joint 30 according to the present invention which has been exaggerated for purposes of illustration. As shown, the first adherend 32 is a metal fitting to which a second adherend 34 is bonded. The second adherend is shown as a multilayer composite in which each layer is, in this embodiment, a plastic impregnated fabric 36 and an adhesive layer 38 is shown between the first adherend 32 and each of the layers of fabric 36.

It has been found that constant stiffness is a desirable goal in designing scarf joints. One means of achieving this is to design a laminate with an equivalent modulus and then allowing the thicknesses of the adherends to be approximately equal. In FIG. 3, the overlap of the layers has been exaggerated somewhat since the formation of the joint under elevated temperatures and pressures flows the plastic adhesive 38, tending to smooth out the surface of the second adherend 34.

Figure 4B:
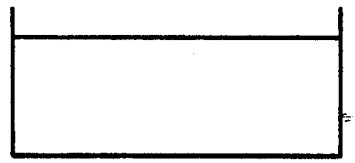
FIG. 4B is a side section view of a scarf joint bond deformed by stresses and a graphic representation of the stresses upon such a joint along the length of the joint.
Figure 4A:
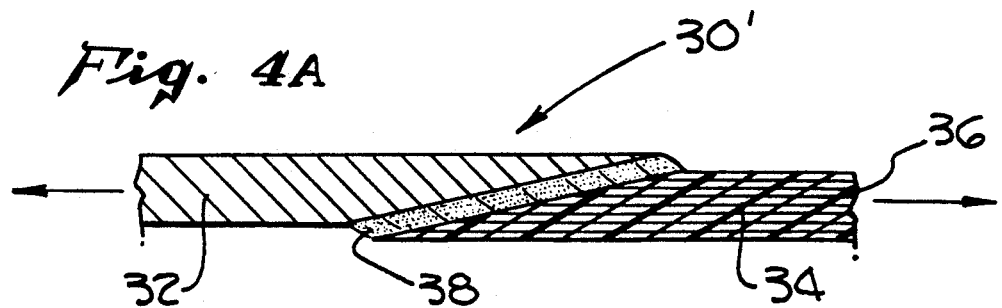
FIG. 4, including FIG. 4A

In FIG. 4, FIG. 4A shows a scarf joint 30' under stress. The adhesive 38 between the first adherend 32 and the second adherend 34 is uniformly deformed. This is because each layer 36 is bonded to the first adherend 32 and the stress is transmitted to each of the layers 36. This is confirmed in FIG. 4B, which shows a uniform level of stress along the full extent of the joint 30'. Whereas in the lap joint, only the bonded layer coupled the stress directly across the bond and the remaining layers were not subjected to the stress except incidentally through the bond between adjacent layers.

Because some adhesives tend to "creep" or "flow" when under stress, it is possible that a permanent deformation of the adhesive may occur during service of the composite part. To prevent this, the scarf joint can be modified as shown in FIG. 5, in which a scarf joint 40 is provided with "stress-free," "anti-creep" zone between the first adherend 42 and the second adherend 44. As with the other embodiments, an adhesive layer 46 exists between the adherends 42, 44.

It is known that the prior art lap joint has a relatively stress free zone in the center of the joint. The scarf joint is uniformly loaded and deformed throughout the joint. According to an alternative embodiment of the present invention, a flattened section 48 is placed in the middle of the joint 40 and functions as a partial lap joint. Generally, only a single layer of the multilayer adherend is involved and even then, the layer is terminated at an area where the taper of the scarf joint resumes.

Turning to FIG. 6, FIG. 6A shows the joint 40 under stress. The adhesive 46 between the first adherend 42 and the second adherend 44 is deformed along the scarf joint portions 50, 52. The lap joint area 48 represents a relatively stress free or "anti-creep" zone.

This can be illustrated in FIG. 6B which is a graph similar to that of FIGS. 2B and 4B. Here the zone of stress is uniform over the region of the first and second scarf joint portions 50, 52 and drops to a zero value in the region of the lap joint 48.

FIG. 7, illustrates an alternative embodiment in which a modified scarf joint 60 is provided with more than one stress free zone 62, 64. The graph of FIG. 7B shows the regions of stress 66 separated by regions 68 which are relatively free of stress. As with the embodiment of FIG. 5, the composite layers which are in the stress free areas 62, 64, extend to the adjacent scarf area to which the edge of the layer is bonded.

The preferred manner of edge termination is illustrated in FIG. 8. A multilayer composite tube 70 is made up of a plurality of turns of a suitable plastic impregnated fabric 72. As shown, in an exaggerated representation, each ply terminates in an edge that extends around the perimeter of the tube 70. The metal fitting 74 to which the tube 70 is to be bonded is shown in dashed lines. For purposes of description, the scarf angle is not in the preferred range of approximately 25:1 as noted above for typical aircraft applications (i.e. length to thickness).

After bonding, the ends of the plies will conform to the inner surface 76 of the metal fitting 74 and the plastic impregnate will flow into the interstices to create a smooth bond between the two adherends. Each ply of the composite will have its own bond to the metal fitting in the incremental area allotted to it. In this way, loads will be transmitted between the metal fitting 74 to all of the plies of the composite tube 70 and not to just the ply in surface contact and those plies that are reasonably close to the surface.

Figure 9:
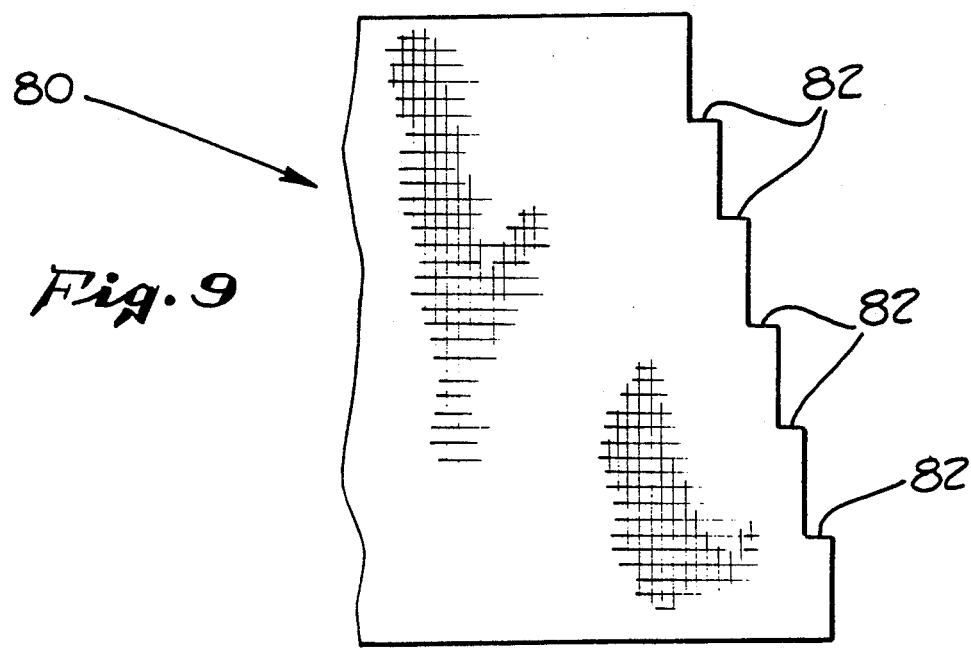
FIG. 9 is a top view of a composite fabric cut to result in the composite tube of FIG. 8.

FIG. 9 is a top view of a section of composite fabric 80 which has been cut to produce the tube 70 of FIG. 8, when rolled on a suitable mandrel. As can be seen, the edge has been cut in a stair step fashion with each step 82 corresponding to the terminal edge of a ply after wrapping. The length of the step (in the direction of tubular axis) is calculated from the predetermined optimum ply step ratio. The width of the successive steps 82, are slightly longer to compensate for the greater diameter of the tube at the completion of each ply.

Figure 10:
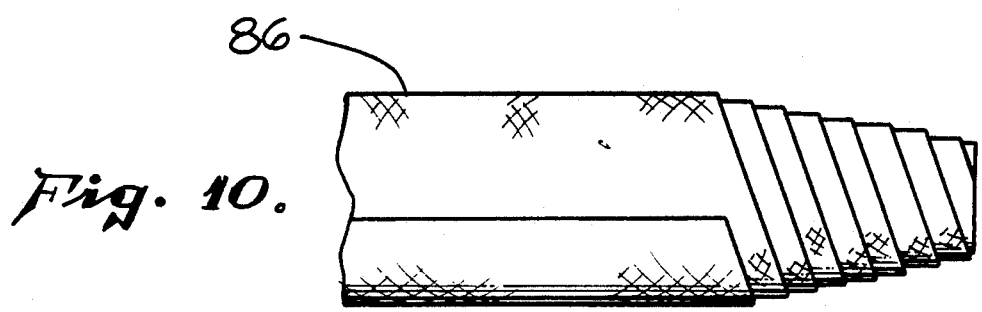
FIG. 10 is top view of a composite tube with a spiral or helical termination of each ply.

FIG. 10 illustrates yet another alternative embodiment of the present invention. A composite tube 86 terminates in a helical or spiral wrap which results from a uniform taper in fabric width from the start of the taper to the end of the fabric. Because the length of the edge for bonding the outermost ply is not constant, there is some concern that the strength of the bond may be less than optimum for the materials involved. Accordingly, the spiral/helical embodiment of FIG. 10 is used for applications which are less critical.

The embodiment of FIG. 10 has advantages in that the cutting of the fabric need not be as precise as in the embodiment of FIG. 9 and may be much less labor intensive.

Figure 11:
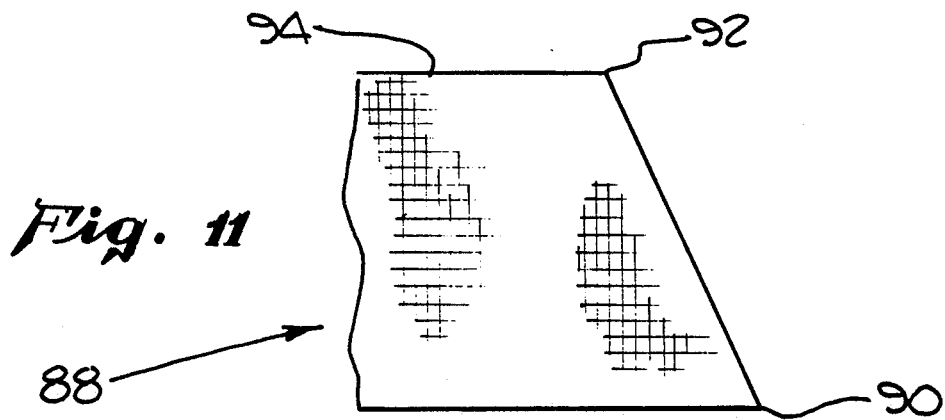
FIG. 11 is a top view of a composite fabric cut to result in the composite tube of FIG. 10.

FIG. 11 is a view of an impregnated composite fabric 88 which has been cut to provide the composite tube of FIG. 10. The fabric or web exhibits a uniform taper from a first width 90 to a second width 92 at the end 94 of the fabric 88.

FIG. 12 represents a compromise between the embodiment of FIG. 8 and the embodiment of FIG. 10. A composite multilayer tube 96 has a first layer which has a "step" edge 98 and a last layer with a step edge 100.

All of the intervening plies terminate in a spiral or helical edge 102.

FIG. 13 is a view of a composite fabric 104, cut to provide the tube 96 of FIG. 12. The composite fabric 104 has a first, step edge 106, a uniform taper edge section 108, and a final step edge 110.

Finally, FIG. 14 shows yet another embodiment of a composite bond according to the present invention. A double scarf joint 116 joins a metal fitting 118 to a multilayer composite tube 120 with some of the plies on the exterior surface 122 of the fitting 118 and some of the plies on the interior surface 124 of the fitting 118.

Thus there has been shown a novel method of joining closed composite structures such as tubes to other adherends, such as metal fittings. In addition, several such joints have been shown by way of example. Accordingly, the scope of the invention should only be limited by the breadth of the claims appended hereto.

What is claimed as new is:

1. A bonded joint connecting two substantially tubular adherends comprising:
   a. a substantially tapered scarf surface on the first adherend including a first tapered portion, a level portion and a second tapered portion;
   b. a substantially tapered scarf surface on the second adherend in a complementary opposing relationship to said scarf surface of the first adherend including a mating first tapered portion, a level portion and a second tapered portion, complementary to said scarf surface on the first adherend; and
   c. an adhesive layer interposed between said scarf surfaces bonding the adherends into a unitary structure of substantially constant thickness across the area of the bond, whereby said adhesive layer transfers applied loads from one adherend to the other, and whereby the joint between the two adherends includes an area that is resistant to creep of said adhesive layer.

2. The bonded joint of claim 1, above wherein the first adherend is of metal, the second adherend is of a composite material and the exterior surface of the second adherend is bonded to an interior surface of the first adherend.

3. The bonded joint of claim 1, above wherein the first adherend is of metal, the second adherend is of a composite material and the exterior surface of the first adherend is bonded to an interior surface of the second adherend.

4. The bonded joint of claim 1, above where at least one of the adherends is a multilayer composite of fibers and plastic matrix and wherein each layer has an incremental edge in adhesive contact with the other adherend.

5. The bonded joint of claim 4, above, wherein each incremental edge extends around the perimeter of the adherend.

6. The bonded joint of claim 4, above, wherein each layer is a part of a continuous layer which has been wound to form the tubular adherend and said incremental edge extends in a spiral around the perimeter of the adherend.

7. The bonded joint of claim 4, above, wherein each layer is part of a continuous layer which has been wound to form the tubular adherend and the incremental edges of some layers extends around the periphery of the adherend and incremental edges of other layers extend in a continuous spiral.

8. The bonded joint of claim 7, above, wherein the incremental edges of the innermost and outermost layers extend completely about the perimeter of the adherend and the incremental edges of the remaining layers extend in a continuous spiral.

9. A bonded joint connecting two substantially tubular adherends comprising:
   a. a substantially tapered scarf surface on the first adherend including a first tapered portion, a first level portion, a second tapered portion, a second level portion and a third tapered portion;
   b. a substantially tapered scarf surface on the second adherend in a complementary opposing relationship to said scarf surface of the first adherend including a mating first tapered portion, a first level portion, a second tapered portion, a second level portion and a third tapered portion, complementary to said scarf surface on the first adherend; and
   c. an adhesive layer interposed between said scarf surfaced bonding the adherends into a unitary structure of substantially constant thickness across the area of the bond, whereby said adhesive layer transfers applied loads from one adherend to the other, and whereby the joint between the two adherends includes areas that are resistant to creep of said adhesive layer.

10. A bonded joint for connecting two substantially tubular adherends comprising:
   a. a first substantially tapered scarf surface on the exterior of a first adherend;
   b. a second substantially tapered scarf surface on the interior of the first adherend convergingly meeting said first scarf surface;
   c. an opposing, diverging pair of substantially tapered scarf surfaces between the exterior and interior surfaces of the second adherend, said pair of scarf surfaces being complementary to said scarf surfaces of the first adherend;
   d. an adhesive layer interposed between opposing scarf surfaces bonding the adherends into a unitary structure of substantially constant thickness across the area of the bond, whereby said adhesive layer transfers applied loads from one adherend to the other.

11. The bonded joint of claim 10, above wherein the first adherend is of metal, the second adherend is of a composite material and said scarf surfaces of the first adherend are bonded to interior surfaces intermediate the outer and inner surfaces of the second adherend.

12. The bonded joint of claim 10, above, wherein said substantially tapered scarf surfaces on the first adherend include a first tapered portion, a level portion and a second tapered portion, and said substantially tapered scarf surfaces on the second adherend include a mating first tapered portion, a level portion and a second tapered portion, complementary to said scarf surfaces on the first adherend, whereby the joint between the two adherends includes areas that are resistant to creep of said adhesive layer.

13. The bonded scarf joint of claim 12, above wherein the second adherend is a multilayer composite of a plurality of fiber layers wound to form a closed tube and wherein each layer terminates in an incremental edge portion that bonds to a portion of the adjacent surface of the second adherend.

14. The bonded scarf joint of claim 13, above, wherein the incremental edge portions adjacent a level portion extend sufficiently to bond to the adjoining tapered portion.

15. A bonded joint for connecting two substantially tubular adherends comprising:
   a. a first substantially tapered scarf surface on the exterior of a first adherend;
   b. a second substantially tapered scarf surface on the interior of the first adherend convergingly meeting said first scarf surface; said substantially tapered scarf surfaces on the first adherend including a first tapered portion, a first level portion, a second tapered portion, a second level portion and a third tapered portion;
   c. an opposing, diverging pair of substantially tapered scarf surfaces between the exterior and interior surfaces of the second adherend, said pair of scarf surfaces being complementary to said scarf surfaces of the first adherend; said substantially tapered scarf surfaces on the second adherend each including a mating first tapered portion, a first level portion, a second tapered portion, a second level portion and a third tapered portion, complementary to said scarf surfaces on the first adherend; and
   d. an adhesive layer interposed between opposing scarf surfaces bonding the adherends into a unitary structure of substantially constant thickness across the area of the bond,
whereby said adhesive layer transfers applied loads from one adherend to the other, whereby the joint between the two adherends includes areas that are resistant to creep of said adhesive layer.

16. The bonded scarf joint of claim 15, above wherein the second adherend is a multilayer composite of a plurality of fiber layers wound to form a closed tube and wherein each layer terminates in an incremental edge portion that bonds to a portion of the adjacent surface of the second adherend.

17. The bonded scarf joint of claim 15, above wherein the second adherend is a multilayer composite of a plurality of fiber layers wound to form a closed tube and wherein each layer terminates in an incremental edge portion that bonds to a portion of the adjacent surface of the second adherend, and wherein the incremental edge portions adjacent level portions extend sufficiently to bond to the adjoining tapered portions.

* * * * *